United States Patent
Endo et al.

(10) Patent No.: US 9,522,601 B2
(45) Date of Patent: Dec. 20, 2016

(54) VEHICLE AND METHOD OF CONTROLLING VEHICLE

(75) Inventors: Hiroki Endo, Nissin (JP); Masaya Yamamoto, Kasugai (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/365,422

(22) PCT Filed: Jan. 23, 2012

(86) PCT No.: PCT/JP2012/051307
§ 371 (c)(1),
(2), (4) Date: Jun. 13, 2014

(87) PCT Pub. No.: WO2013/111258
PCT Pub. Date: Aug. 1, 2013

(65) Prior Publication Data
US 2015/0002053 A1 Jan. 1, 2015

(51) Int. Cl.
*B62D 11/02* (2006.01)
*G05D 1/00* (2006.01)
(Continued)

(52) U.S. Cl.
CPC ............ *B60L 11/1803* (2013.01); *B60K 6/445* (2013.01); *B60L 11/005* (2013.01); *B60L 11/126* (2013.01); *B60L 11/14* (2013.01); *B60L 11/1816* (2013.01); *B60L 11/1883* (2013.01); *B60L 15/2045* (2013.01); *B60W 10/26* (2013.01); *B60L 2240/12* (2013.01); *B60L 2240/421* (2013.01); *B60L 2240/423* (2013.01); *B60L 2240/441* (2013.01); *B60L 2240/443* (2013.01); *B60L 2240/461* (2013.01); *B60L 2240/463* (2013.01); *B60L 2240/545* (2013.01); *B60L 2240/547* (2013.01); *B60L 2240/549* (2013.01);
(Continued)

(58) Field of Classification Search
USPC ............................... 477/7; 318/271; 180/443
See application file for complete search history.

(56) References Cited

U.S. PATENT DOCUMENTS 3,668,495 A * 6/1972 Eisele ................... H02P 7/2925
318/271
6,255,939 B1 * 7/2001 Roth ..................... B60R 21/015
340/425.5
(Continued)

FOREIGN PATENT DOCUMENTS

EP 2055548 A1 5/2009
EP 2056391 A1 5/2009
(Continued)

Primary Examiner — Eduardo Colon Santana
Assistant Examiner — Cortez Cook
(74) Attorney, Agent, or Firm — Sughrue Mion, PLLC

(57) ABSTRACT

An ECU determines whether or not first operation for limiting an upper limit value of discharge power of a power storage device for supplying electric power to a rotating electric machine for generating a driving force of a vehicle has been received, by setting a first threshold value of an operation duration of an operation device required to determine the reception of the first operation to be greater than a second threshold value of operation duration of the operation device required to determine the reception of second operation for canceling the limitation of the upper limit value.

5 Claims, 8 Drawing Sheets

(51) Int. Cl.
  *B60L 11/18*   (2006.01)
  *B60K 6/445*   (2007.10)
  *B60W 10/26*   (2006.01)
  *B60L 11/00*   (2006.01)
  *B60L 11/12*   (2006.01)
  *B60L 11/14*   (2006.01)
  *B60L 15/20*   (2006.01)

(52) U.S. Cl.
  CPC ....... *B60L 2250/16* (2013.01); *B60L 2250/26* (2013.01); *Y02T 10/6217* (2013.01); *Y02T 10/6239* (2013.01); *Y02T 10/645* (2013.01); *Y02T 10/7022* (2013.01); *Y02T 10/7072* (2013.01); *Y02T 10/7077* (2013.01); *Y02T 10/72* (2013.01); *Y02T 10/7283* (2013.01); *Y02T 90/14* (2013.01); *Y02T 90/34* (2013.01)

(56) References Cited

U.S. PATENT DOCUMENTS

| | | |
|---|---|---|
| 2003/0094816 A1 | 5/2003 | Kazama |
| 2010/0030416 A1 | 2/2010 | Jinno |
| 2010/0030445 A1* | 2/2010 | Ishikawa ................ B60T 7/122 701/81 |
| 2010/0052588 A1 | 3/2010 | Okamura et al. |
| 2010/0248893 A1* | 9/2010 | Shimanaka ............. B60K 6/48 477/5 |
| 2010/0317485 A1* | 12/2010 | Gillingham ............ B60K 1/04 477/7 |
| 2011/0000736 A1* | 1/2011 | Oya ....................... B60L 1/003 180/443 |

FOREIGN PATENT DOCUMENTS

| | | |
|---|---|---|
| EP | 2404802 A1 | 1/2012 |
| JP | H05-184017 A | 7/1993 |
| JP | 2003-235108 A | 8/2003 |
| JP | 2008-128192 A | 6/2008 |
| JP | 2008-278705 A | 11/2008 |
| JP | 2008-301598 A | 12/2008 |
| JP | 2009-005532 A | 1/2009 |
| JP | 2011-183875 A | 9/2011 |
| JP | 2011-188569 A | 9/2011 |
| JP | 2011-207300 A | 10/2011 |
| WO | 2008/090875 A1 | 7/2008 |

* cited by examiner

VEHICLE AND METHOD OF CONTROLLING VEHICLE

CROSS REFERENCE TO RELATED APPLICATIONS

This application is a National Stage of International Application No. PCT/JP2012/051307 filed Jan. 23, 2012, the contents of all of which are incorporated herein by reference in their entirety.

TECHNICAL FIELD

The present invention relates to controlling a vehicle incorporating a rotating electric machine serving as a driving source and a power storage device supplying electric power to the rotating electric machine.

BACKGROUND ART

Japanese Patent Laying-Open No. 2003-235108 (PTL 1) discloses a hybrid vehicle in which an output from a motor that generates a driving force is limited by operation of a charging switch. A technique is also known of varying an upper limit value of discharge power of a battery incorporated in a hybrid vehicle in accordance with the will of an occupant of the vehicle by using a switch or the like.

CITATION LIST

Patent Literature

PTL 1: Japanese Patent Laying-Open No. 2003-235108

SUMMARY OF INVENTION

Technical Problem

If such a switch is erroneously operated by the occupant of the vehicle, however, the upper limit value of discharge power of the battery is varied against the will of the occupant. The occupant may thus feel odd at variation in driving force of the vehicle.

An object of the present invention is to provide a vehicle capable of suppressing variation in driving force due to erroneous operation and generating a driving force intended by an occupant of the vehicle, and a method of controlling the vehicle.

Solution to Problem

A vehicle according to one aspect of the present invention includes a rotating electric machine for generating a driving force of a vehicle, a power storage device for supplying electric power to the rotating electric machine, an operation device for receiving operation of varying an upper limit value of discharge power of the power storage device, and a controller for controlling the discharge power so that the upper limit value of the discharge power is limited when the operation device receives first operation for limiting the upper limit value, and the limitation of the upper limit value is canceled when the operation device receives second operation for canceling the limitation of the upper limit value. The controller determines whether or not the first operation has been received by setting an amount of operation of the operation device required to determine the reception of the first operation to be greater than the amount of operation required to determine the reception of the second operation.

Preferably, the controller determines that the first operation has been received when an operation duration of the operation device is equal to or longer than a first threshold value, and determines that the second operation has been received when the operation duration is equal to or longer than a second threshold value. The first threshold value is greater than the second threshold value.

More preferably, the controller determines that the first operation has been received when a number of operations of the operation device is equal to or larger than a first threshold value, and determines that the second operation has been received when the number of operations is equal to or larger than a second threshold value. The first threshold value is greater than the second threshold value.

More preferably, the controller varies the upper limit value of the discharge power so that variation in the upper limit value of the discharge power when the upper limit value is limited in response to the reception of the first operation is more gradual than variation when the limitation of the upper limit value of the discharge power is canceled in response to the reception of the second operation.

More preferably, when the first operation is received, the controller selects a predetermined running mode from a plurality of running modes, and limits the upper limit value of the discharge power to a degree greater than when another running mode is selected, and when the second operation is received, the controller cancels the selection of the predetermined running mode, and cancels the limitation of the upper limit value of the discharge power.

More preferably, the vehicle further includes an internal combustion engine for charging the power storage device. The plurality of running modes include a first running mode, a second running mode as the predetermined running mode, and a third running mode. Both of the first and second running modes are running modes in which the vehicle is controlled under execution conditions for executing, with priority, control of running the vehicle with the internal combustion engine being stopped. The third running mode is a running mode in which the vehicle is controlled under execution conditions for executing, with priority, control of running the vehicle with the internal combustion engine being operated.

A method of controlling a vehicle according to another aspect of the present invention is used for a vehicle including a rotating electric machine for generating a driving force, a power storage device for supplying electric power to the rotating electric machine, and an operation device for receiving operation of varying an upper limit value of discharge power of the power storage device. This method of controlling a vehicle includes the steps of controlling the discharge power so that the upper limit value of the discharge power is limited when the operation device receives first operation for limiting the upper limit value, controlling the discharge power so that the limitation of the upper limit value is canceled when the operation device receives second operation for canceling the limitation of the upper limit value, and determining whether or not the first operation has been received by setting an amount of operation of the operation device required to determine the reception of the first operation to be greater than the amount of operation required to determine the reception of the second operation.

Advantageous Effects of Invention

According to the present invention, an operation time required to determine the reception of the first operation for limiting the upper limit value of the discharge power of the power storage device is set to be longer than an operation time required to determine the reception of the second operation. As a result, the vehicle occupant's intention of limiting the upper limit value of the discharge power of the power storage device can be determined with high accuracy. Thus, variation in driving force against the will of the occupant can be suppressed. Accordingly, a vehicle capable of suppressing variation in driving force due to erroneous operation and generating a driving force intended by an occupant, and a method of controlling the vehicle can be provided.

DESCRIPTION OF EMBODIMENTS

An embodiment of the present invention will be described below with reference to the drawings. In the following description, the same parts are denoted with the same reference signs. Their designations and functions are also the same. Therefore, detailed descriptions thereof will not be repeated.

Figure 1:
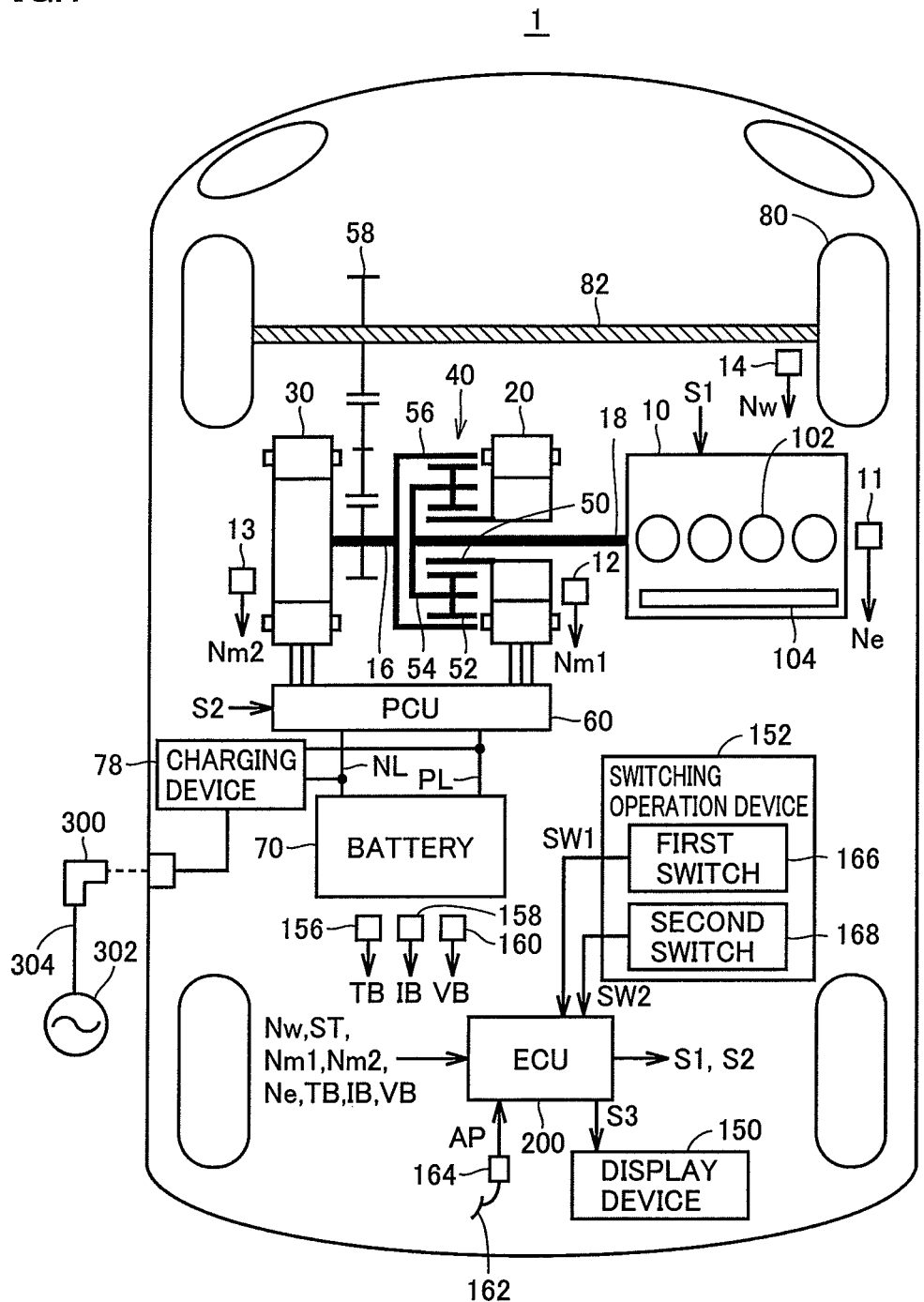
FIG. 1 is a general block diagram of a vehicle according to an embodiment.

Referring to FIG. 1, a general block diagram of a hybrid vehicle 1 (simply referred to as vehicle 1 in the following description) according to this embodiment is described. Vehicle 1 includes an engine 10, a first motor generator (hereinafter referred to as first MG) 20, a second motor generator (hereinafter referred to as second MG) 30, a power split device 40, a reduction gear 58, a PCU (Power Control Unit) 60, a battery 70, a charging device 78, a drive wheel 80, a display device 150, a switching operation device 152, and an ECU (Electronic Control Unit) 200.

Vehicle 1 runs using a driving force output from at least one of engine 100 and second MG 30. Motive power generated by engine 10 is split into two paths by power split device 40. One of them is a path through which the power is transmitted to drive wheel 80 via reduction gear 58, and the other is a path through which the power is transmitted to first MG 20.

Each of first MG 20 and second MG 30 is a three-phase AC rotating electric machine, for example. First MG 20 and second MG 30 are driven by PCU 60.

First MG 20 has the function of a generator for generating power using motive power from engine 10 that is split by power split device 40, to charge battery 70 via PCU 60. In addition, first MG 20 rotates a crankshaft 18 serving as an output shaft of engine 10, with electric power received from battery 70. First MG 20 thus has the function of a starter for starting engine 10.

Second MG 30 has the function of a driving motor for providing a driving force to drive wheel 80 by using at least one of electric power stored in battery 70 and electric power generated by first MG 20. Second MG 30 also has the function of a generator for charging battery 70 via PCU 60 by using electric power generated by regenerative braking.

Engine 10 is an internal combustion engine such as a gasoline engine or a diesel engine.

Engine 10 includes a plurality of cylinders 102, and a fuel injection device 104 for supplying fuel to each of the plurality of cylinders 102. Engine 10 is only required to have at least one cylinder 102.

In response to a control signal S1 from ECU 200, fuel injection device 104 injects a suitable amount of fuel at suitable timing into each cylinder, and stops the fuel injection into each cylinder. An amount of fuel injected by fuel injection device 104 is adjusted based on injection time.

Engine 10 is further provided with an engine rotational speed sensor 11. Engine rotational speed sensor 11 detects a rotational speed of crankshaft 18 of engine 10 (hereinafter referred to as engine speed) Ne. Engine rotational speed sensor 11 transmits a signal indicating detected engine speed Ne to ECU 200.

Power split device 40 mechanically couples three elements, i.e., a rotation shaft 16 for rotating drive wheel 80, crankshaft 18 of engine 10, and a rotation shaft of first MG 20, to one another. Power split device 40 uses one of the three elements as a reaction force element, to allow the transmission of motive power between the other two elements. A rotation shaft of second MG 30 is coupled to rotation shaft 16.

Power split device 40 is a planetary gear mechanism including a sun gear 50, pinion gears 52, a carrier 54, and a ring gear 56. Pinion gears 52 are engaged with sun gear 50 and ring gear 56. Carrier 54 supports pinion gears 52 so that they are rotatable on their own axes, and is coupled to crankshaft 18 of engine 10. Sun gear 50 is coupled to the rotation shaft of first MG 20. Ring gear 56 is coupled to the rotation shaft of second MG 30 and reduction gear 58 via rotation shaft 16.

Reduction gear 58 transmits motive power from power split device 40 and second MG 30 to drive wheel 80. Reduction gear 58 also transmits a reaction force from a road surface received by drive wheel 80 to power split device 40 and second MG 30.

PCU 60 includes a plurality of switching elements. PCU 60 controls on/off operation of the switching elements to convert DC power stored in battery 70 to AC power for driving first MG 20 and second MG 30. PCU 60 includes a converter and an inverter (neither shown) controlled in response to a control signal S2 from ECU 200. The converter boosts a voltage of the DC power received from battery 70, and outputs the power to the inverter. The inverter converts the DC power output from the converter to AC power, and outputs the power to first MG 20 and/or second MG 30. As a result, first MG 20 and/or second MG 30 are driven with the electric power stored in battery 70. The inverter converts AC power generated by first MG 20 and/or second MG 30 to DC power, and outputs the power to the converter. The converter down-converts a voltage of the DC power output from the inverter, and outputs the power to battery 70. As a result, battery 70 is charged with the electric power generated by first MG 20 and/or second MG 30. The converter may not be provided.

Battery 70 is a power storage device, and is a rechargeable DC power supply. A secondary battery such as a nickel-metal hydride battery or a lithium-ion battery is used as battery 70. Battery 70 has a voltage of about 200 V, for example. Battery 70 is charged with the electric power generated by first MG 20 and/or second MG 30 as described above, and may further be charged with electric power supplied from an external power supply 302. Battery 70 is not limited to a secondary battery, but may be a capacitor, a solar cell, or a fuel cell, for example, which is capable of generating a DC voltage.

Battery 70 is provided with a battery temperature sensor 156, a current sensor 158, and a voltage sensor 160.

Battery temperature sensor 156 detects a battery temperature TB of battery 70. Battery temperature sensor 156 transmits a signal indicating battery temperature TB to ECU 200.

Current sensor 158 detects a current 1B of battery 70. Current sensor 158 transmits a signal indicating current 1B to ECU 200.

Voltage sensor 160 detects a voltage VB of battery 70. Voltage sensor 160 transmits a signal indicating voltage VB to ECU 200.

ECU 200 estimates a remaining capacity (referred to as SOC (State of Charge) in the following description) of battery 70 based on current 1B, voltage VB and battery temperature TB of battery 70. ECU 200 may estimate an OCV (Open Circuit Voltage) based on current 1B, voltage VB and battery temperature TB, to estimate the SOC of battery 70 based on the estimated OCV and a predetermined map, for example. Alternatively, ECU 200 may sum up a charge current and a discharge current of battery 70 to estimate the SOC of battery 70, for example.

Charging device 78 charges battery 70 with electric power supplied from external power supply 302 when a charging plug 300 is inserted into vehicle 1. Charging plug 300 is connected to one end of a charging cable 304. Charging cable 304 has the other end connected to external power supply 302. Charging device 78 has a positive electrode terminal connected to a power supply line PL connecting a positive electrode terminal of PCU 60 to a positive electrode terminal of battery 70. Charging device 78 has a negative electrode terminal connected to a ground line NL connecting a negative electrode terminal of PCU 60 to a negative electrode terminal of battery 70.

First MG 20 is provided with a first resolver 12. First resolver 12 detects a speed Nm1 of first MG 20. First resolver 12 transmits a signal indicating detected speed Nm1 to ECU 200.

Second MG 30 is provided with a second resolver 13. Second resolver 13 detects a speed Nm2 of second MG 30. Second resolver 13 transmits a signal indicating detected speed Nm2 to ECU 200.

A drive shaft 82 coupling reduction gear 58 to drive wheel 80 is provided with a wheel speed sensor 14. Wheel speed sensor 14 detects a speed Nw of drive wheel 80. Wheel speed sensor 14 transmits a signal indicating detected speed Nw to ECU 200. ECU 200 calculates a vehicle speed V based on received speed Nw. ECU 200 may calculate vehicle speed V based on speed Nm2 of second MG 30 instead of speed Nw.

A driver's seat is provided with an accelerator pedal 162. Accelerator pedal 162 includes a pedal stroke sensor 164. Pedal stroke sensor 164 detects a stroke amount AP of accelerator pedal 162. Pedal stroke sensor 164 transmits a signal indicating stroke amount AP to ECU 200. Instead of pedal stroke sensor 164, an accelerator pedal effort sensor for detecting pedal effort of an occupant of vehicle 1 on the accelerator pedal may be used.

ECU 200 generates control signal S1 for controlling engine 10, and outputs generated control signal S1 to engine 10. ECU 200 generates control signal S2 for controlling PCU 60, and outputs generated control signal S2 to PCU 60. ECU 200 generates a control signal S3 for controlling display device 150, and outputs generated control signal S3 to display device 150.

ECU 200 controls engine 10, PCU 60 and the like, to control the entire hybrid system, namely, charge and discharge states of battery 70, and operating states of engine 10, first MG 20 and second MG 30, so that vehicle 1 can run most efficiently.

ECU 200 calculates requested power corresponding to stroke amount AP of accelerator pedal 162 provided on the driver's seat and vehicle speed V. If auxiliary machinery is to be activated, ECU 200 adds power required to activate the auxiliary machinery to the calculated requested power. The auxiliary machinery as used herein refers to an air-conditioner, for example. ECU 200 controls a torque of first MG 20, a torque of second MG 30, or an output from engine 10, depending on the calculated request power.

In this embodiment, running modes include a first CD (Charge Depleting) mode, a second CD mode, and a CS (Charge Sustaining) mode.

The first and second CD modes are running modes in which EV running is given a higher priority than HV running. When the first and second CD modes are selected, ECU 200 controls vehicle 1 under execution conditions for executing EV running with a higher priority than HV running.

The CS mode is a running mode in which HV running is given a higher priority than EV running. When the CS mode is selected, ECU 200 controls vehicle 1 under execution conditions for executing HV running with a higher priority than EV running.

The EV running refers to a running state of vehicle 1, in which vehicle 1 runs using second MG 30, with engine 10 being stopped. The HV running refers to a running state of vehicle 1, in which engine 10 is activated and first MG 20 generates power to maintain the SOC of battery 70 at a target value.

The second CD mode is a running mode for continuing EV running longer than when the first CD mode is selected. When the second CD mode is selected, ECU 200 limits an upper limit value Wout of discharge power of battery 70 to a degree greater than when the first CD mode is selected.

Display device 150 displays a currently selected running mode and the like in response to control signal S3 from ECU 200. Display device 150 may be implemented as an LCD (Liquid Crystal Display) or an LED (Light-Emitting Diode), for example. Instead of display device 150, a notification device for notifying the occupant of vehicle 1 of a currently selected running mode by voice or the like may be used.

Switching operation device 152 receives operation of switching the running mode from the occupant of vehicle 1. Switching operation device 152 includes a push switch, a slide switch, a lever switch, a dial switch, or a touch panel, for example.

In this embodiment, switching operation device 152 includes a first switch 166 and a second switch 168.

First switch 166 is provided around the driver's seat, and receives operation for switching from one of the first CD mode and the CS mode to the other mode. When the operation by the occupant of vehicle 1 is received, first switch 166 transmits a signal SW1 indicating the reception to ECU 200.

In response to signal SW1, ECU 200 switches the running mode from one of the first CD mode and the CS mode currently selected to the other mode not currently selected.

In response to signal SW1 when the first CD mode is being selected, for example, ECU 200 switches the running mode from the first CD mode to the CS mode. In response to signal SW1 when the CS mode is being selected, for example, ECU 200 switches the running mode from the CS mode to the first CD mode.

Second switch 168 is provided around the driver's seat, and receives first operation for switching the running mode from the first CD mode or the CS mode to the second CD mode (for selecting the second CD mode), and second operation for switching the running mode from the second CD mode to the first CD mode or the CS mode (for canceling the selection of the second CD mode). When the operation by the occupant of vehicle 1 is received, second switch 168 transmits a signal SW2 indicating the reception to ECU 200.

In response to signal SW2, ECU 200 determines whether the received operation is the first operation or the second operation based on the currently selected running mode. For example, in response to signal SW2 when the first CD mode or the CS mode is being selected, ECU 200 determines that the first operation has been received. In response to signal SW2 when the second CD mode is being selected, ECU 200 determines that the second operation has been received.

If it is determined that the first operation has been received, ECU 200 switches the running mode from the first CD mode or the CS mode to the second CD mode. That is, ECU 200 selects the second CD mode when it is determined that the first operation has been received.

If it is determined that the second operation has been received, ECU 200 switches the running mode from the second CD mode to the first CD mode or the CS mode. That is, ECU 200 cancels the selection of the second CD mode when it is determined that the second operation has been received.

When canceling the selection of the second CD mode, ECU 200 may select a running mode (one of the first CD mode and the CS mode) immediately before the selection of the second CD mode.

When the second CD mode is being selected, and if the state of vehicle 1 satisfies a predetermined condition, ECU 200 may cancel the selection of the second CD mode without receiving signal SW2.

The predetermined condition includes, for example, at least one of the condition that engine 10 is being started, the condition that the vehicle speed is equal to or greater than a threshold value, the condition that the stroke amount of accelerator pedal 162 is equal to or greater than a threshold value, the condition that warm-up of engine 10 is requested, the condition that the SOC of battery 70 is equal to or lower than a threshold value, the condition that the temperature of battery 70 is out of a predetermined range, and the condition that heating is requested.

ECU 200 executes HV running and EV running in accordance with requested power Preq when each running mode is selected.

For example, when requested power Preq is equal to or smaller than a threshold value, ECU 200 executes EV running, and controls PCU 60 so that running power Ptrv corresponding to requested power Preq is generated only with an output from second MG 30.

When requested power Preq exceeds the threshold value, on the other hand, ECU 200 executes HV running, and controls PCU 60 and engine 10 so that running power Ptrv corresponding to requested power Preq is generated with an output from engine 10 and an output from second MG 30.

Figure 2:
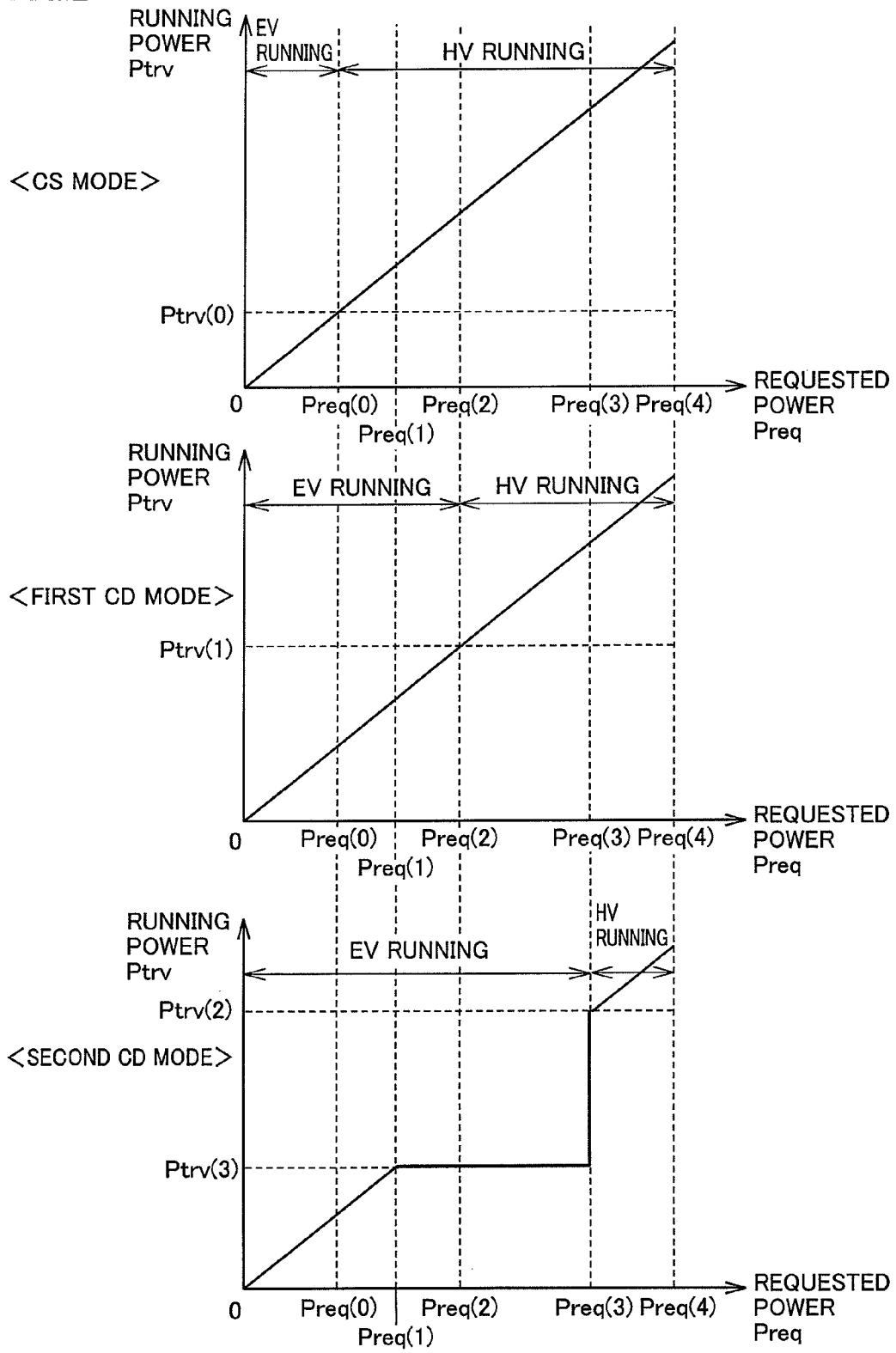
FIG. 2 illustrates relation between requested power and running power when each running mode is selected.

FIG. 2 illustrates relation between requested power Preq and running power Ptrv, and a change in running state, when each running mode is selected.

Specifically, FIG. 2 illustrates at the top the relation between requested power Preq and running power Ptrv, and the change in running state, when the CS mode is selected. At the top of FIG. 2, the ordinate represents running power Ptrv, and the abscissa represents requested power Preq.

FIG. 2 illustrates in the middle the relation between requested power Preq and running power Ptrv, and the change in running state, when the first CD mode is selected. In the middle of FIG. 2, the ordinate represents running power Ptrv, and the abscissa represents requested power Preq.

FIG. 2 illustrates at the bottom the relation between requested power Preq and running power Ptrv, and the change in running state, when the second CD mode is selected. At the bottom of FIG. 2, the ordinate represents running power Ptrv, and the abscissa represents requested power Preq. Each abscissa in FIG. 2 may represent stroke amount AP of the accelerator pedal instead of the requested power.

In FIG. 2, although requested power Preq and running power Ptrv are described as having linear relation in each running mode except for a period between Preq(1) and Preq(3) of requested power Preq in the second CD mode, they are not particularly limited to have the linear relation. For example, requested power Preq and running power Ptrv may have nonlinear relation in which running power Ptrv monotonously increases as requested power Preq increases, except for the above period. In FIG. 2, Preq(4) indicates an upper limit value of requested power Preq. When requested power Preq is Preq(4), accelerator pedal 162 is depressed until an upper limit value of stroke amount AP is reached.

As shown in FIG. 2, a threshold value Preq(0) of requested power Preq for switching the running state between HV running and EV running when the CS mode is selected as the running mode is smaller than threshold values Preq(2) and Preq(3) when the first CD mode and the second CD mode are selected.

Thus, when the CS mode is selected, an area of requested power Preq where HV running is executed (between Preq(0) and Preq(3)) is larger than the area when the first CD mode or the second CD mode is selected. When the CS mode is selected, therefore, HV running is executed with a higher priority than when the first CD mode or the second CD mode is selected.

When the CS mode is selected, ECU 200 executes HV running with a higher priority than EV running, to control charge and discharge of battery 70 so that the SOC of battery 70 attains a target value.

When the SOC of battery 70 is lower than the target value, for example, ECU 200 controls an output from engine 10, a torque of first MG 20 or a torque of second MG 30 so that charge power is higher than discharge power, while generating running power Ptrv corresponding to requested power Preq.

When the SOC of battery 70 is higher than the target value, for example, ECU 200 controls an output from engine 10, a torque of first MG 20 or a torque of second MG 30 so that running power Ptrv corresponding to requested power Preq of vehicle 1 is generated, while allowing discharge power to be higher than charge power. That is, engine 10 generates charge power to battery 70 and running power.

The target value of the SOC of battery 70 may be a constant value, or may be the SOC of battery 70 at a point in time when the CS mode is selected, or may be a value obtained by adding or subtracting a predetermined value to or from the SOC at the point in time when the CS mode is selected.

For example, when the CS mode is selected, and if a current value of the SOC of battery 70 is greater than an upper limit value of the SOC, ECU 200 may stop engine 10 and execute EV running.

Threshold value Preq(2) of requested power Preq for switching the running state between HV running and EV running when the first CD mode is selected is larger than threshold value Preq(0) when the CS mode is selected, and is smaller than threshold value Preq(3) when the second CD mode is selected.

Thus, when the first CD mode is selected, an area of requested power Preq where EV running is executed (between 0 and Preq(2)) is larger than the area when the CS mode is selected. When the first CD mode is selected, therefore, EV running is executed with a higher priority than when the CS mode is selected.

When the second CD mode is selected, an area of requested power Preq where EV running is executed (between 0 and Preq(3)) is larger than the area when the CS mode or the first CD mode is selected. When the second CD mode is selected, therefore, EV running is continued longer than when the first CD mode is selected.

When the first CD mode is selected, and if requested power Preq exceeds threshold value Preq(2), or when the second CD mode is selected, and if requested power Preq exceeds threshold value Preq(3), ECU 200 controls an output from engine 10, a torque of first MG 20 and a torque of second MG 30 so that running power Ptrv corresponding to requested power Preq as shown in the middle and at the bottom of FIG. 2 is generated with outputs from second MG 30 and engine 10. Here, engine 10 generates running power.

When the first CD mode is selected, and if requested power Preq is equal to or smaller than threshold value Preq(2), or when the second CD mode is selected, and if requested power Preq is equal to or smaller than threshold value Preq(3), ECU 200 controls a torque of second MG 30 so that running power Ptrv corresponding to requested power Preq is generated with an output from second MG 30.

Furthermore, when the second CD mode is selected, ECU 200 reduces upper limit value Wout of discharge power of battery 70. Thus, as shown at the bottom of FIG. 2, in a period between Preq(1) and Preq(3) of requested power Preq, running power Ptrv is limited not to exceed running power Ptrv(3) corresponding to reduced upper limit value Wout of discharge power. By limiting running power Ptrv by reducing upper limit value Wout of discharge power in this manner, heat generation and power consumption of PCU 60 can be reduced as compared to when the first CD mode is selected. As a result, a distance that can be run during EV running can be improved as compared to when the first CD mode is selected.

If second switch 168 is erroneously operated by the occupant of vehicle 1 having the configuration as described above, for example, the running mode may be changed, which causes variation in upper limit value Wout of discharge power of battery 70 against the will of the occupant. The occupant may thus feel odd at the variation in driving force of vehicle 1.

To address this issue, this embodiment is characterized in that ECU 200 determines whether or not the first operation or the second operation has been received, by setting an amount of operation of second switch 168 required to determine the reception of the first operation for limiting upper limit value Wout of discharge power of battery 70 to be greater than the amount of operation required to determine the reception of the second operation for canceling the limitation of upper limit value Wout of discharge power of battery 70.

More specifically, ECU 200 determines that the first operation has been received when an operation duration Tsw of second switch 168 is equal to or longer than a first threshold value Tsw(1) when the second CD mode is not being selected. First threshold value Tsw(1) is preferably a value greater than one second, for example.

ECU 200 determines that the second operation has been received when operation duration Tsw of second switch 168 is equal to or longer than a second threshold value Tsw(2) when the second CD mode is being selected. Second threshold value Tsw(2) is preferably a value equal to or smaller than one second, for example. That is, first threshold value Tsw(1) is greater than second threshold value Tsw(2).

Operation duration Tsw of second switch 168 is a period of time during which the operation of second switch 168 is continued, and during which the transmission of signal SW2 to ECU 200 is continued. More specifically, operation duration Tsw of second switch 168 is a period of time during which the operation of second switch 168 by the occupant of vehicle 1 from an initial position to a position that causes signal SW2 indicating the operation of second switch 168 to ECU 200 (hereinafter referred to as on state) is continued.

Figure 3:
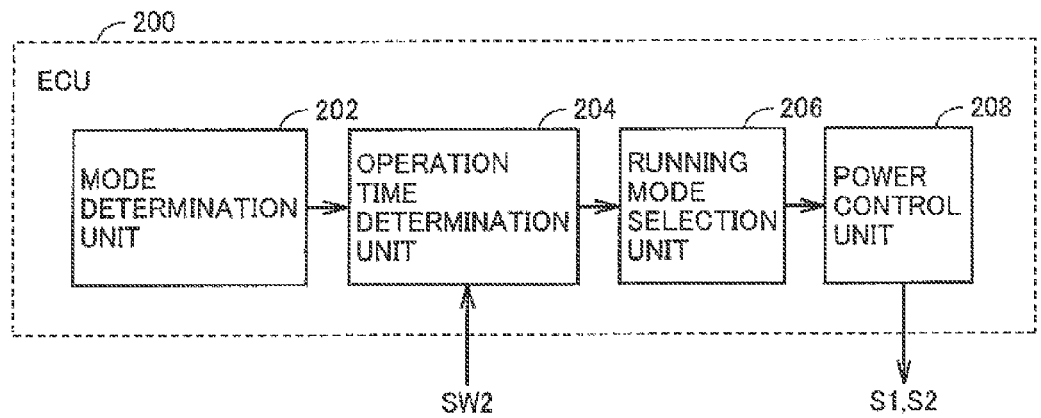
FIG. 3 is a functional block diagram of an ECU incorporated in the vehicle according to the embodiment.

FIG. 3 is a functional block diagram of ECU 200 incorporated in vehicle 1 according to this embodiment. ECU 200 includes a mode determination unit 202, an operation time determination unit 204, a running mode selection unit 206, and a power control unit 208.

Mode determination unit 202 determines whether or not the second CD mode is being selected. Mode determination unit 202 determines whether or not the second CD mode is being selected based on the state of an execution flag of the second CD mode, for example.

As will be described later, the execution flag of the second CD mode is turned on when the second CD mode is selected by running mode selection unit 206, and is turned off when the selection of the second CD mode is canceled.

Mode determination unit 202 determines that the second CD mode is being selected when the execution flag of the second CD mode is on, and determines that the second CD mode is not being selected when the execution flag of the second CD mode is off.

Alternatively, mode determination unit 202 may determine that the second CD mode is not being selected if the first CD mode or the CS mode is being selected. The determination of whether or not the first CD mode or the CS mode is being selected can be made based on the state of an execution flag in a manner similar to that of the determination of whether or not the second CD mode is being selected, and detailed descriptions thereof will not be repeated.

Operation time determination unit 204 determines whether or not operation duration Tsw of second switch 168 is equal to or longer than a threshold value corresponding to the currently selected running mode.

If mode determination unit 202 determines that the second CD mode has not been selected, operation time determination unit 204 determines whether or not operation duration Tsw of second switch 168 is equal to or longer than first threshold value Tsw(1).

If the second CD mode has not been selected, and if operation duration Tsw of second switch 168 is equal to or longer than first threshold value Tsw(1), for example, operation time determination unit 204 may turn on a first operation determination flag.

If mode determination unit 202 determines that the second CD mode is being selected, operation time determination unit 204 determines whether or not operation duration Tsw of second switch 168 is equal to or longer than second threshold value Tsw(2).

If the second CD mode is being selected, and if operation duration Tsw of second switch 168 is equal to or longer than second threshold value Tsw(2), for example, operation time determination unit 204 may turn on a second operation determination flag.

Figure 4:
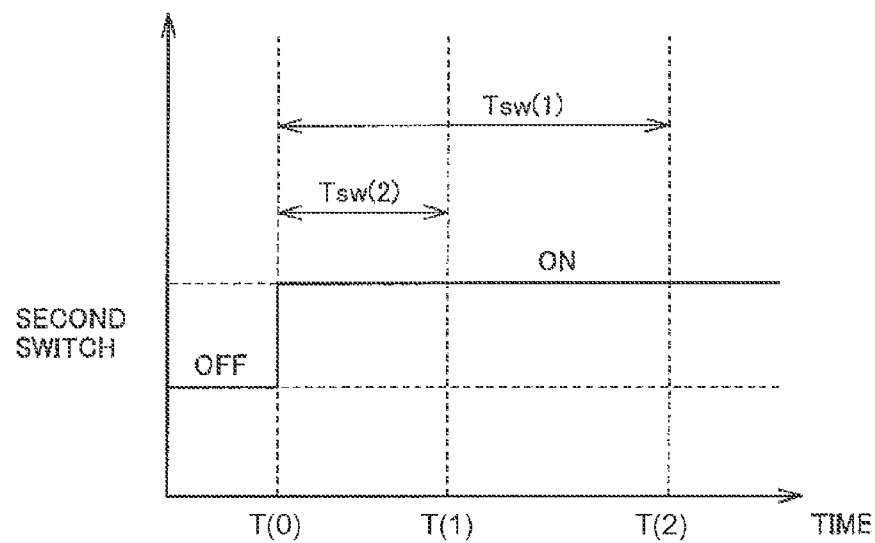
FIG. 4 illustrates operation time of a second switch when a second EV mode is selected and canceled.

First threshold value Tsw(1) is greater than second threshold value Tsw(2). Thus, when second switch 168 enters an on state at time T(0) when the second CD mode is being selected, as shown in FIG. 4, for example, operation time determination unit 204 determines that operation duration Tsw is equal to or longer than second threshold value Tsw(2) upon lapse of time T(1).

When second switch 168 enters an on state at time T(0) when the second CD mode is not being selected, for example, operation time determination unit 204 determines that operation duration Tsw is equal to or longer than first threshold value Tsw(1) upon lapse of time T(2) after time T(1).

Running mode selection unit 206 selects a running mode based on the results of determinations by mode determination unit 202 and operation time determination unit 204.

If the second CD mode has not been selected, and when operation duration Tsw of second switch 168 is equal to or longer than first threshold value Tsw(1), running mode selection unit 206 selects the second CD mode as the running mode.

Alternatively, running mode selection unit 206 may select the second CD mode when the first operation determination flag is turned on. Running mode selection unit 206 selects the second CD mode as the running mode, and turns on the execution flag of the second CD mode.

If the second CD mode is being selected, and when operation duration Tsw of second switch 168 is equal to or longer than second threshold value Tsw(2), running mode selection unit 206 cancels the selection of the second CD mode.

Running mode selection unit 206 may cancel the selection of the second CD mode by selecting a running mode that was selected immediately before the selection of the second CD mode, or by selecting one of the first CD mode and the CS mode based on the state of vehicle 1, or by selecting a predetermined running mode.

Power control unit 208 varies upper limit value Wout of discharge power of battery 70 in response to the selection and the cancellation of the selection of the second CD mode, and controls the discharge power of battery 70 not to exceed varied upper limit value Wout.

When the second CD mode is selected, for example, power control unit 208 reduces upper limit value Wout of discharge power of battery 70 to a degree greater than when the second CD mode is not selected.

When the second CD mode is selected, for example, power control unit 208 varies upper limit value Wout of discharge power of battery 70, with Wout(1) as a target value. When the selection of the second CD mode is canceled, for example, power control unit 208 varies upper limit value Wout of discharge power of battery 70, with Wout(2) as a target value.

Target value Wout(1) is smaller than at least target value Wout(2), and corresponds to upper limit value Ptrv(3) of running power Ptrv during EV running shown in FIG. 2 when the second CD mode is selected.

Target value Wout(2) corresponds to upper limit value Ptrv(1) of running power Ptrv during EV running shown in FIG. 2 when the first CD mode is selected.

Target values Wout(1) and Wout(2) may be predetermined values, or may be calculated by amending the predetermined values depending on the state of vehicle 1.

When the second CD mode is selected, and if a current value Wout' of upper limit value Wout of discharge power of battery 70 does not match (is different from) target value Wout(1), power control unit 208 varies upper limit value Wout so that current value Wout' varies with a first variation amount ΔWout(1) to match target value Wout(1).

First variation amount ΔWout(1) is described as indicating an amount of variation in upper limit value Wout of each calculation cycle. That is, when the second CD mode is selected, power control unit 208 adds first variation amount ΔWout(1) at each calculation cycle until current value Wout' matches target value Wout(1) (or until the difference between current value Wout' and target value Wout(1) becomes equal to or smaller than a predetermined value). As a result, upper limit value Wout approaches target value Wout(1) with time.

When the second CD mode is selected, and if current value Wout' matches target value Wout(1) (or if the difference between current value Wout' and target value Wout(1) is equal to or smaller than the predetermined value), power control unit 208 maintains upper limit value Wout.

Power control unit 208 controls the discharge power of battery 70 not to exceed upper limit value Wout that varies with first variation amount ΔWout(1) at each calculation cycle.

Figure 5:
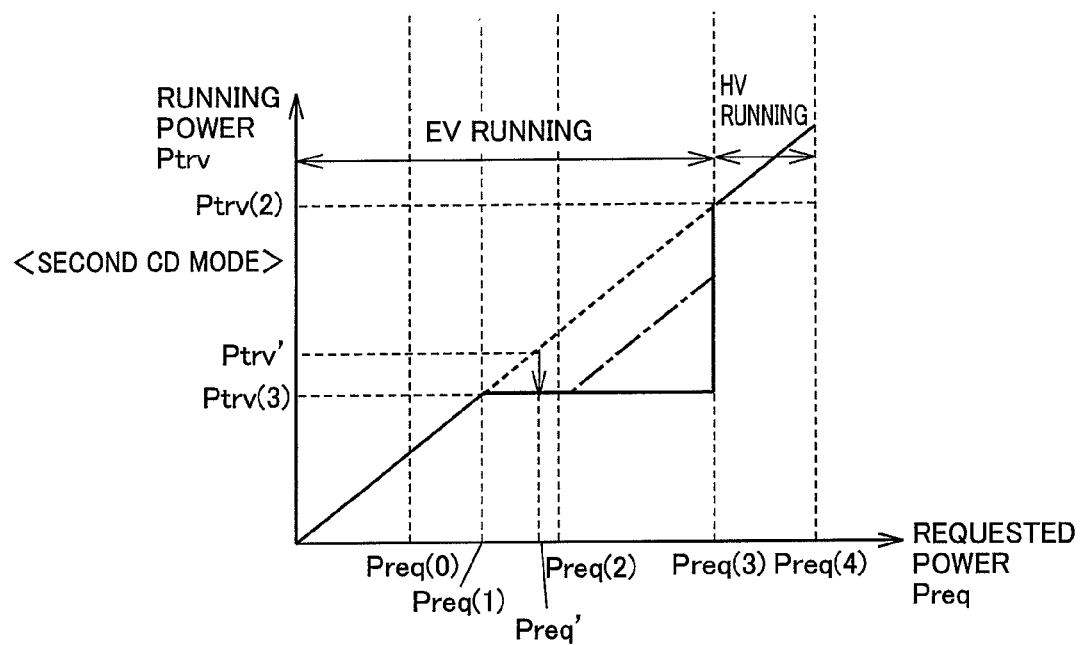
FIG. 5 illustrates relation between requested power and running power when a second CD mode is selected.

As shown in FIG. 5, when the second CD mode is selected, in the period between Preq(1) and Preq(3), the relation between requested power Preq and running power Ptrv indicated with a broken line in FIG. 5 is changed to the relation indicated with a solid line in FIG. 5. Here, by reducing upper limit value Wout with first variation amount ΔWout(1), the relation between requested power Preq and running power Ptrv indicated with a broken line in FIG. 5 is changed to be offset so that running power Ptrv decreases as the relation indicated with a chain-dotted line in FIG. 5, for example.

For example, it is assumed that a state where requested power Preq is Preq' is continued before and after switching from the first CD mode to the second CD mode. If running power Ptrv is Ptrv' before the second CD mode is selected, running power Ptrv starts decreasing, from a point in time when the second CD mode is selected, from Ptrv' to Ptrv(3) with time. By limiting upper limit value Wout of discharge power when the second CD mode is selected in this manner, running power Ptrv is limited to upper limit value Ptrv(3).

When the selection of the second CD mode is canceled, and if current value Wout' of upper limit value Wout of discharge power of battery 70 does not match (is different from) target value Wout(2), power control unit 208 varies upper limit value Wout so that current value Wout' varies with a second variation amount ΔWout(2) to match target value Wout(2). Second variation amount ΔWout(2) is greater than first variation amount ΔWout(1).

Second variation amount ΔWout(2) is described as indicating an amount of variation in upper limit value Wout of each calculation cycle. That is, when the selection of the second CD mode is canceled, the power control unit adds second variation amount ΔWout(2) at each calculation cycle until current value Wout' matches target value Wout(2) (or until the difference between current value Wout' and target value Wout(2) becomes equal to or smaller than a predetermined value). As a result, upper limit value Wout approaches target value Wout(2) with time.

When the selection of the second CD mode is canceled, and if current value Wout' matches target value Wout(2) (or if the difference between current value Wout' and target value Wout(2) is equal to or smaller than a predetermined value), power control unit 208 maintains upper limit value Wout.

Power control unit 208 controls the discharge power of battery 70 not to exceed upper limit value Wout that varies with second variation amount ΔWout(2) at each calculation cycle.

As shown in FIG. 5, when the selection of the second CD mode is canceled, in the period between Preq(1) and Preq(3), the relation between requested power Preq and running power Ptrv indicated with a solid line in FIG. 5 is changed to the relation indicated with a broken line in FIG. 5, by varying upper limit value Wout with second variation amount ΔWout(2).

For example, it is assumed that a state where running power Preq is Preq' is continued before and after switching from the second CD mode to the first CD mode. If running power Ptrv is Ptrv(3) before the selection of the second CD mode is canceled, running power Ptrv starts increasing, from a point in time when the selection of the second CD mode is canceled, from Ptrv(3) to Ptrv' with time. By canceling the limitation of upper limit value Wout of discharge power when the selection of the second CD mode is canceled in this manner, running power Ptrv is recovered to Ptrv'.

Although mode determination unit 202, operation time determination unit 204, running mode selection unit 206 and power control unit 208 are all described as having the function of software implemented when a CPU in ECU 200 executes a program stored in a memory, they may be implemented as hardware. Such a program is recorded on a recording medium and incorporated in vehicle 1.

Figure 6:
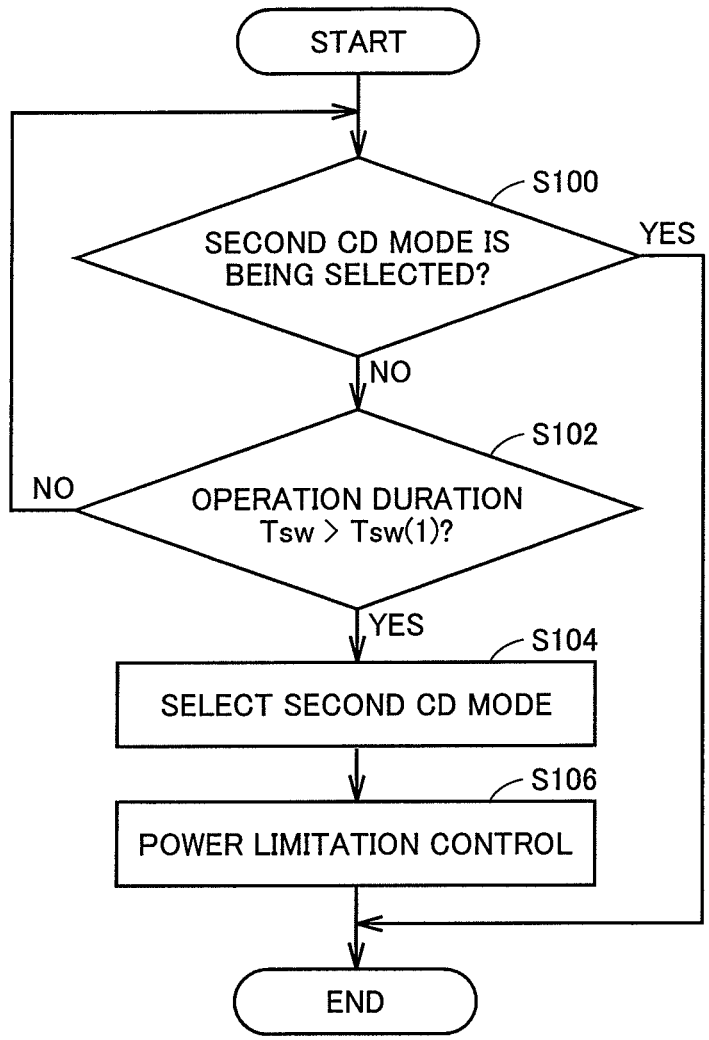
FIG. 6 is a (first) flowchart illustrating the control structure of a program executed by the ECU incorporated in the vehicle according to the embodiment.

Referring to FIG. 6, the control structure of a program for selecting the second CD mode, which is executed by ECU 200 incorporated in vehicle 1 according to the embodiment, is described.

In step (hereinafter referred to as S) 100, ECU 200 determines whether or not the second CD mode is being selected. If the second CD mode is being selected (YES in S100), the process ends. If not (NO in S100), the process proceeds to S102.

In S102, ECU 200 determines whether or not operation duration Tsw of second switch 168 is equal to or longer than first threshold value Tsw(1). If operation duration Tsw of second switch 168 is equal to or longer than first threshold value Tsw(1) (YES in S102), the process proceeds to S104. If not (NO in S102), the process returns to S100.

In S104, ECU 200 selects the second CD mode as the running mode. In S106, ECU 200 performs power limitation control. The power limitation control is control of varying upper limit value Wout of discharge power of battery 70 to target value Wout(1) with first variation amount ΔWout(1), while preventing the discharge power from exceeding upper limit value Wout. The contents of the power limitation control have been described above as the operation of power control unit 208. Therefore, detailed descriptions thereof will not be repeated.

Figure 7:
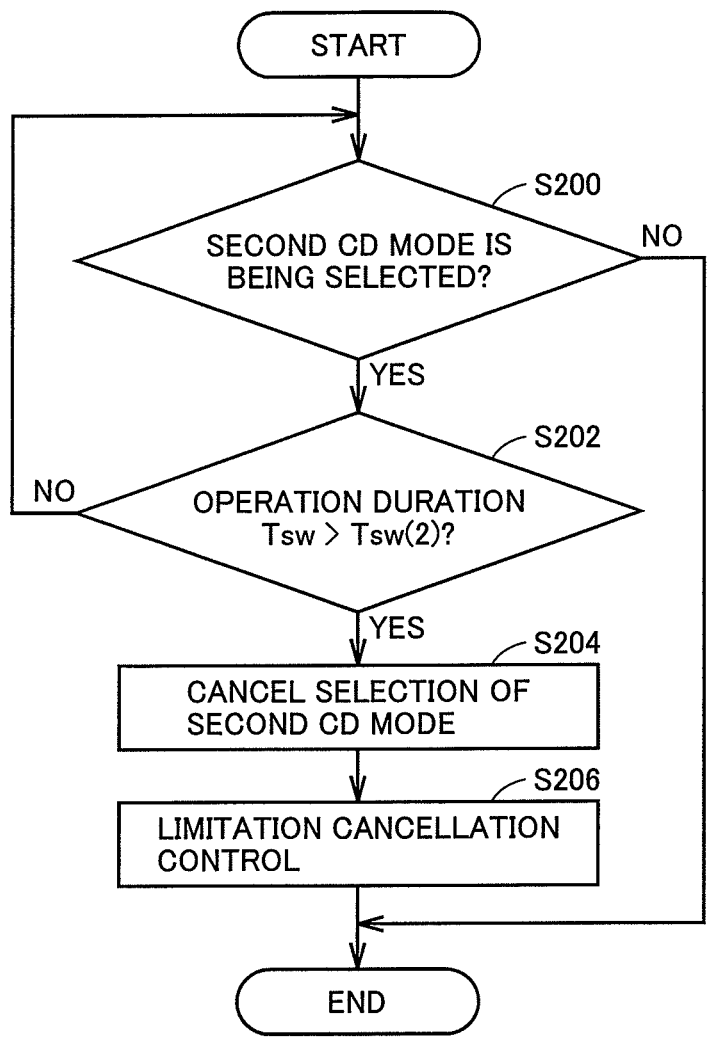
FIG. 7 is a (second) flowchart illustrating the control structure of a program executed by the ECU incorporated in the vehicle according to the embodiment.

Referring to FIG. 7, the control structure of a program for canceling the selection of the second CD mode, which is executed by ECU 200 incorporated in vehicle 1 according to the embodiment, is described.

In S200, ECU 200 determines whether or not the second CD mode is being selected. If the second CD mode is being selected (YES in S200), the process proceeds to S202. If not (NO in S200), the process ends.

In S202, ECU 200 determines whether or not operation duration Tsw of second switch 168 is equal to or longer than second threshold value Tsw(2). If operation duration Tsw of second switch 168 is equal to or longer than second threshold value Tsw(2) (YES in S202), the process proceeds to S204. If not (NO in S202), the process returns to S200.

In S204, ECU 200 cancels the selection of the second CD mode. Here, ECU 200 selects a running mode that was selected immediately before the selection of the second CD mode.

In S206, ECU 200 performs limitation cancellation control. The limitation cancellation control is control of varying upper limit value Wout of discharge power of battery 70 to target value Wout(2) with second variation amount ΔWout(2), while preventing the discharge power from exceeding upper limit value Wout. The contents of the limitation cancellation control have been described above as the operation of power control unit 208. Therefore, detailed descriptions thereof will not be repeated.

Figure 8:
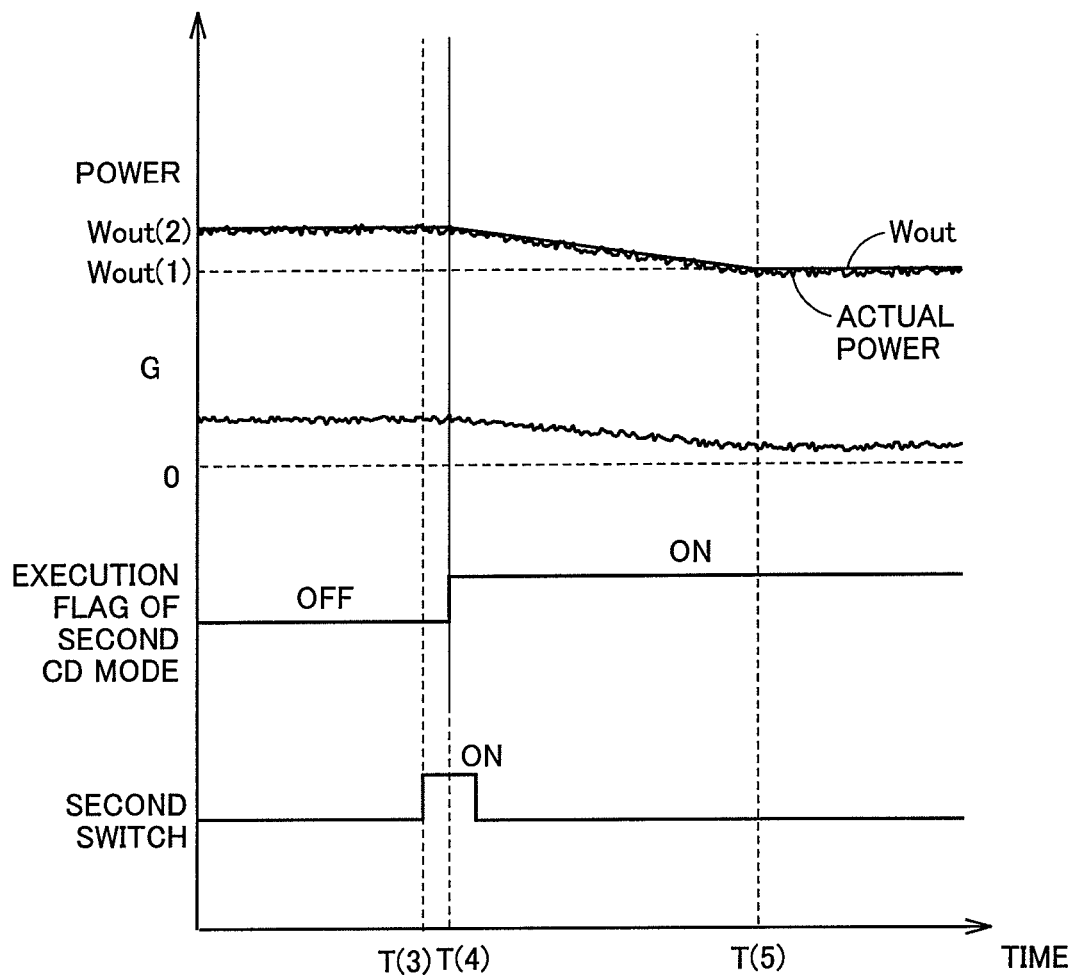
FIG. 8 is a (first) diagram illustrating operation of the ECU incorporated in the vehicle according to the embodiment.
Figure 9:
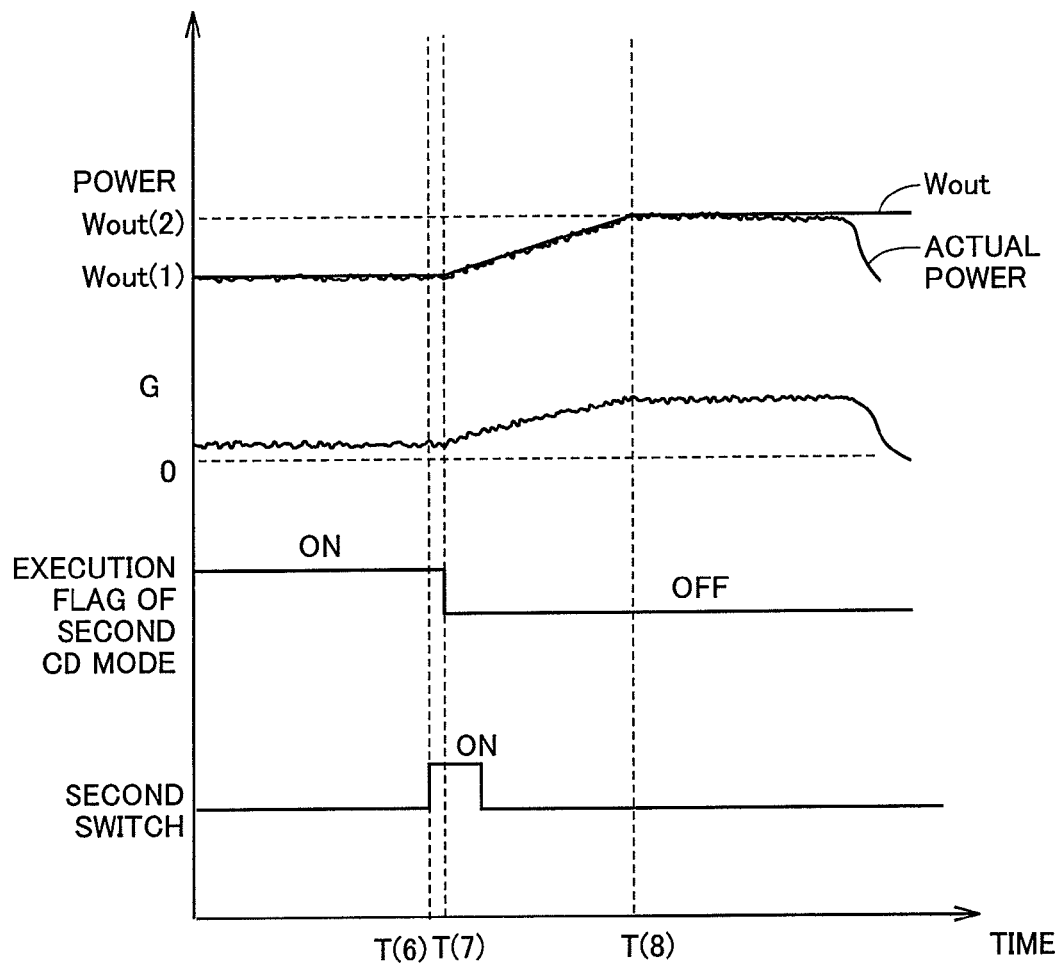
FIG. 9 is a (second) diagram illustrating operation of the ECU incorporated in the vehicle according to the embodiment.

The operation of ECU 200 incorporated in vehicle 1 according to this embodiment based on the above structures and flowcharts is described with reference to FIGS. 8 and 9.

<When Second CD Mode is Selected>

For example, it is assumed that the first CD mode is being selected (NO in S100). Here, the execution flag of the second CD mode is off, as shown in FIG. 8. In vehicle 1, second MG 30 is controlled to attain running power Ptrv close to upper limit value Wout of discharge power of battery 70.

At time T(3), second switch 168 enters an on state by the operation by the occupant of vehicle 1, and at time T(4), operation duration Tsw becomes longer than first threshold value Tsw(1) (YES in S102). As a result, the second CD mode is selected (S104). The execution flag of the second CD mode is thus turned on. Consequently, the power limitation control is performed (S106).

ECU 200 performs the power limitation control, to vary upper limit value Wout of discharge power of battery 70 to decrease to target value Wout(1) with first variation amount ΔWout(1). ECU 200 also controls the discharge power of battery 70 not to exceed varied upper limit value Wout. Since upper limit value Wout of discharge power gradually decreases with first variation amount ΔWout(1), a driving force is gradually limited, which leads to gradual variation in acceleration (G) acting on vehicle 1.

<When Selection of Second CD Mode is Canceled>

For example, it is assumed that the second CD mode is being selected (YES in S200). Here, the execution flag of the second CD mode is on, as shown in FIG. 9. In vehicle 1, second MG 30 is controlled to attain running power Ptrv close to limited upper limit value Wout of discharge power of battery 70.

At time T(6), second switch 168 enters an on state by the operation by the occupant of vehicle 1, and at time T(7), operation duration Tsw becomes equal to second threshold value Tsw(2) (YES in S202). As a result, the selection of the second CD mode is canceled (S204). The execution flag of the second CD mode is thus turned off. Consequently, the limitation cancellation control is performed (S206).

ECU 200 performs the limitation cancellation control, to vary upper limit value Wout of discharge power of battery 70 to increase to target value Wout(2) with second variation amount ΔWout(2). ECU 200 also controls the discharge power of battery 70 not to exceed varied upper limit value Wout. Since upper limit value Wout of discharge power gradually increases with second variation amount ΔWout(2), the limitation of a driving force is gradually canceled, which leads to gradual variation in acceleration (G) acting on vehicle 1.

As described above, according to the vehicle of this embodiment, first threshold value Tsw(1) of operation duration Tsw for determining the reception of the first operation for limiting upper limit value Wout of discharge power of battery 70 is set to be greater than second threshold value Tsw(2) for determining the reception of the second operation for canceling the limitation. As a result, the vehicle occupant's intention of selecting the second CD mode can be determined with high accuracy. Thus, variation in driving force against the will of the occupant can be suppressed. Accordingly, a vehicle capable of suppressing variation in driving force due to erroneous operation and generating a driving force intended by an occupant, and a method of controlling the vehicle can be provided.

Furthermore, by setting second threshold value Tsw(2) of operation duration Tsw for determining the reception of the second operation to be smaller than first threshold value Tsw(1), the limitation of upper limit value Wout of discharge power of battery 70 can be canceled with high responsivity.

Moreover, by varying upper limit value Wout so that variation when upper limit value Wout is limited in response to the selection of the second CD mode is more gradual than variation when the limitation of upper limit value Wout is canceled in response to the cancellation of the selection of the second CD mode, a driver can be prevented from feeling odd at a reduction in driving force when upper limit value Wout is limited.

Although vehicle 1 has been described in this embodiment as a hybrid vehicle having the configuration shown in FIG. 1, vehicle 1 may be any vehicle provided with an operation device for varying the upper limit value of discharge power of battery 70, and is not particularly limited to have the configuration shown in FIG. 1. Vehicle 1 may be a hybrid vehicle in another form, a hybrid vehicle executing only HV running without executing EV running, or an electrically-powered vehicle.

Although ECU 200 has been described in this embodiment as selecting the second CD mode when operation duration Tsw of second switch 168 is equal to or longer than first threshold value Tsw(1) when the second CD mode is not being selected, and as canceling the selection of the second CD mode when operation duration Tsw of second switch 168 is equal to or longer than second threshold value Tsw(2) when the second CD mode is being selected, ECU 200 is not particularly limited to perform in this manner.

For example, ECU 200 may select the second CD mode when a number of operations Nsw of second switch 168 is equal to or larger than Nsw(1) when the second CD mode is not being selected, and cancel the selection of the second CD mode when the number of operations Nsw of second switch 168 is equal to or larger than Nsw(2) when the second CD mode is being selected. Nsw(1) is a value larger than Nsw(2). Such arrangement provides the same function and effect as that provided in this embodiment.

Although the selection and the cancellation of the selection of the second CD mode has been described in this embodiment as being made using the same switch (second switch 168), the selection and the cancellation of the selection of the second CD mode may be made using different switches.

Although the present invention has been described as being applied to second switch 168 for performing operation of reducing the upper limit value of discharge power when the second CD mode is selected, and of recovering the upper limit value when the limitation is canceled, the present invention is not particularly limited to be applied to such a switch.

For example, the present invention may be applied to a power switch, an economy switch, a charging switch, a battery-depletion suppressing switch or the like. In any case, the determination of whether or not the first operation or the second operation has been received can be made by setting an operation time for determining the reception of the first operation for limiting (reducing) upper limit value Wout of discharge power to be longer than an operation time for determining the reception of the second operation for canceling the limitation (increasing upper limit value Wout).

The power switch is a switch for selecting and canceling the selection of a power mode. The power switch increases upper limit value Wout of discharge power when the power mode is selected, and recovers upper limit value Wout of discharge power (reduces upper limit value Wout to its original value) when the selection of the power mode is canceled.

The economy switch is a switch for selecting and canceling the selection of an economy mode. The economy switch reduces upper limit value Wout of discharge power when the economy mode is selected, and increases upper limit value Wout of discharge power when the selection of the economy mode is canceled.

The charging switch is a switch for selecting and canceling the selection of a charge mode in which the SOC of battery 70 is increased. The charging switch reduces upper limit value Wout of discharge power when the charge mode is selected, and increases upper limit value Wout of discharge power when the selection of the charge mode is canceled.

The battery-depletion suppressing switch is a switch for selecting and canceling the selection of a battery-depletion suppression mode in which the depletion of battery 70 is suppressed. The battery-depletion suppressing switch reduces upper limit value Wout of discharge power when the battery-depletion suppression mode is selected, and increases upper limit value Wout of discharge power when the selection of the battery-depletion suppression mode is canceled.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

REFERENCE SIGNS LIST 1 hybrid vehicle; 10 engine; 11 engine rotational speed sensor; 12, 13 resolver; 14 wheel speed sensor; 16 rotation shaft; 18 crankshaft; 20, 30 MG; 40 power split device; 50 sun gear; 52 pinion gear; 54 carrier; 56 ring gear; 58 reduction gear; 60 PCU; 70 battery; 78 charging device; 80 drive wheel; 82 drive shaft; 102 cylinder; 104 fuel injection device; 150 display device; 152 switching operation device; 156 battery temperature sensor; 158 current sensor; 160 voltage sensor; 162 accelerator pedal; 164 pedal stroke sensor; 166, 168 switch; 200 ECU; 202 mode determination unit; 204 operation time determination unit; 206 running mode selection unit; 208 power control unit; 300 charging plug; 302 external power supply; 304 charging cable.

The invention claimed is:

1. A vehicle comprising:
   a rotating electric machine configured to generate a driving force of a vehicle;
   a power storage device configured to supply electric power to said rotating electric machine;
   an operation device configured to receive operation of varying an upper limit value of discharge power of said power storage device; and
   a controller configured to control said discharge power so that said upper limit value of said discharge power is limited when said operation device receives first operation for limiting said upper limit value, and the limitation of said upper limit value is canceled when said operation device receives second operation for canceling the limitation of said upper limit value,
   said controller being configured to determine whether or not said first operation has been received based on an amount of operation of said operation device, the amount of operation required to determine the reception of said first operation being greater than the amount of operation required to determine the reception of said second operation,
   said controller being configured to determine that said first operation has been received when a number of operations of said operation device is equal to or larger than a first threshold value, and determines that said second operation has been received when said number of operations is equal to or larger than a second threshold value, and
   said first threshold value being greater than said second threshold value.

2. The vehicle according to claim 1, wherein
   said controller varies said upper limit value of said discharge power so that variation in said upper limit value of said discharge power when said upper limit value is limited in response to the reception of said first operation is more gradual than variation when the limitation of said upper limit value of said discharge power is canceled in response to the reception of said second operation.

3. The vehicle according to claim 1, wherein
   when said first operation is received, said controller selects a predetermined running mode from a plurality of running modes, and limits said upper limit value of said discharge power to a degree greater than when another running mode is selected, and when said second operation is received, said controller cancels the selection of said predetermined running mode, and cancels the limitation of said upper limit value of said discharge power.

4. The vehicle according to claim 3, further comprising an internal combustion engine for charging said power storage device, wherein
   said plurality of running modes include a first running mode, a second running mode as said predetermined running mode, and a third running mode,
   both of said first and second running modes are running modes in which said vehicle is controlled under execution conditions for executing, with priority, control of running said vehicle with said internal combustion engine being stopped, and
   said third running mode is a running mode in which said vehicle is controlled under execution conditions for executing, with priority, control of running said vehicle with said internal combustion engine being operated.

5. A method of controlling a vehicle, used for a vehicle including a rotating electric machine configured to generate a driving force, a power storage device configured to supply electric power to said rotating electric machine, and an operation device configured to receive operation of varying an upper limit value of discharge power of said power storage device, comprising the steps of:
   controlling said discharge power so that said upper limit value of said discharge power is limited when said operation device receives first operation for limiting said upper limit value;
   controlling said discharge power so that the limitation of said upper limit value is canceled when said operation device receives second operation for canceling the limitation of said upper limit value;
   determining whether or not said first operation has been received based on an amount of operation of said operation device, the amount of operation required to determine the reception of said first operation being greater than the amount of operation required to determine the reception of said second operation; and
   determining that said first operation has been received when a number of operations of said operation device is equal to or larger than a first threshold value, and determines that said second operation has been received when said number of operations is equal to or larger than a second threshold value, and
   said first threshold value being greater than said second threshold value.

* * * * *